Nov. 7, 1950  G. W. PENNEY  2,528,842
DUST-PRECIPITATING MEANS WITH SEPARABLE
PLATE-ASSEMBLY UNITS
Filed May 13, 1947  3 Sheets-Sheet 1
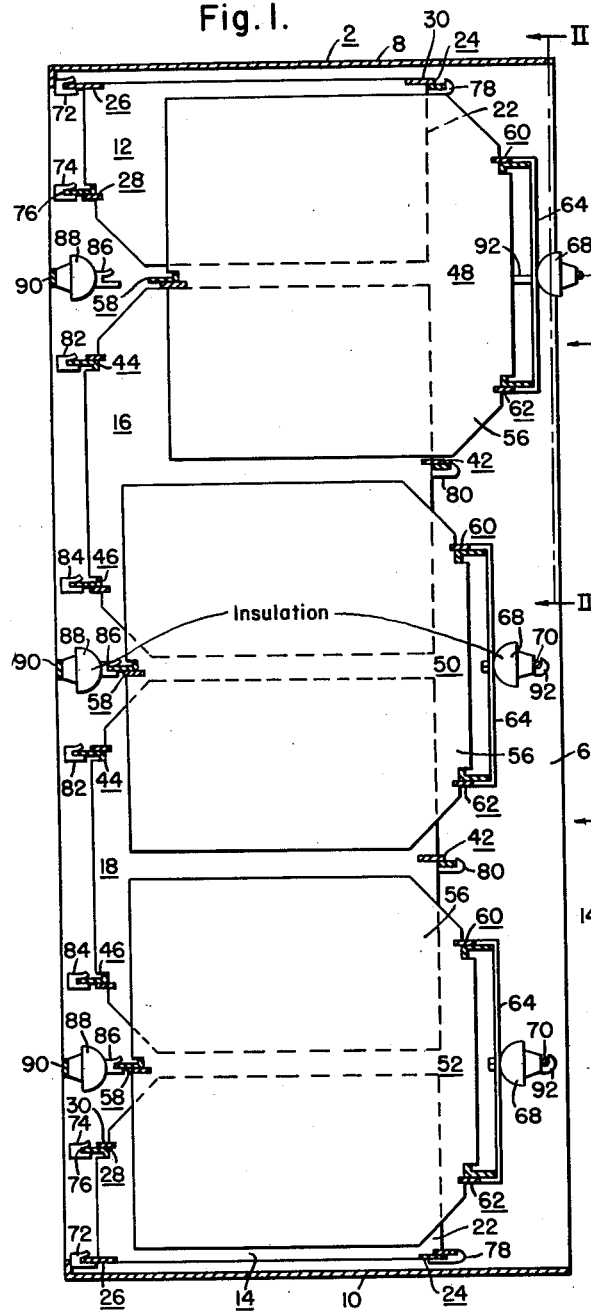
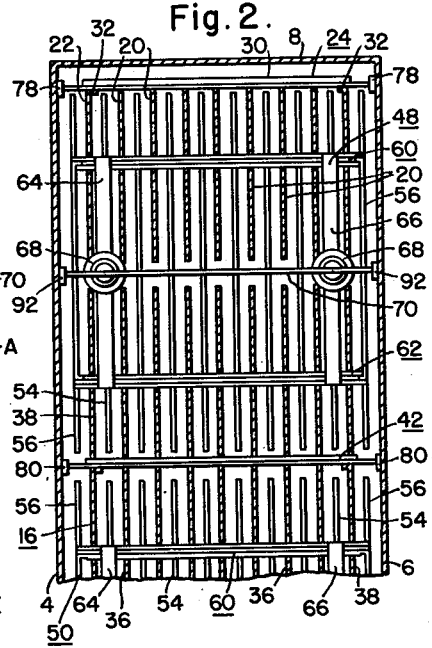
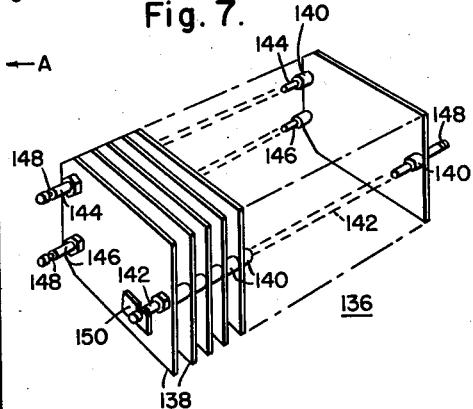
WITNESSES:
Robert C. Baird
New. C. Groove
INVENTOR
Gaylord W. Penney.
BY
B. L. Zanquill
ATTORNEY

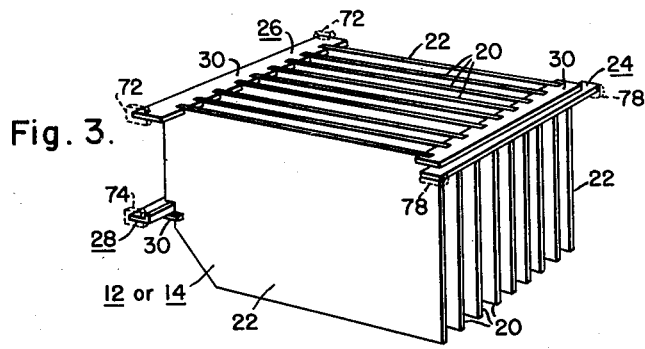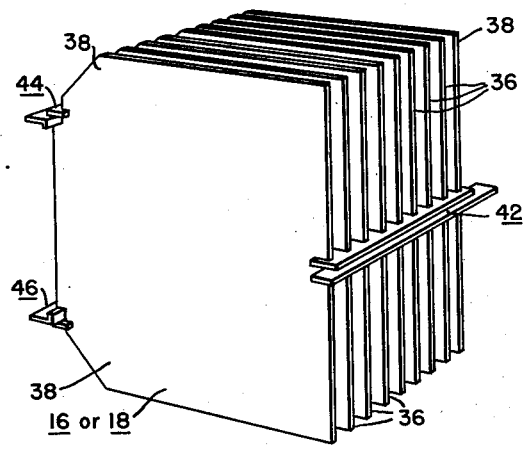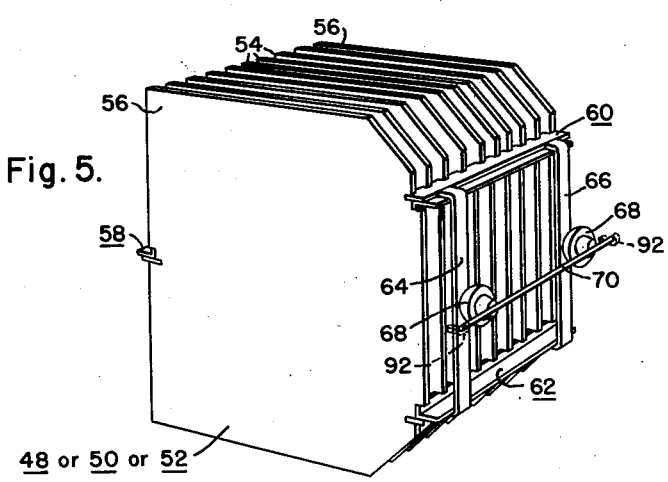

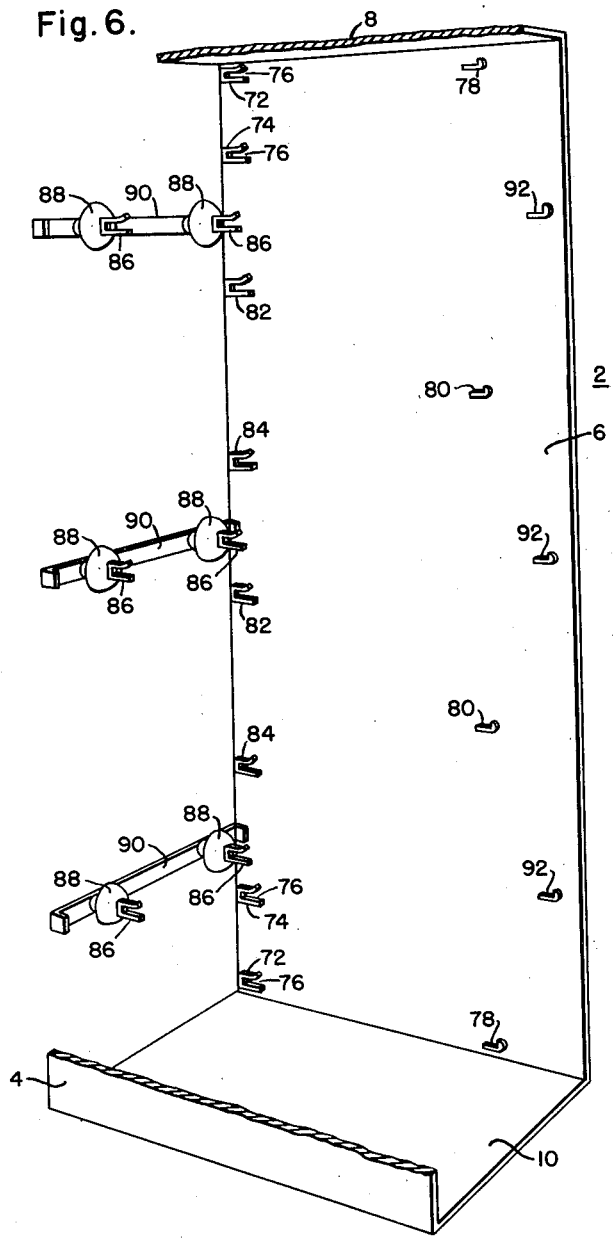

Patented Nov. 7, 1950

2,528,842

UNITED STATES PATENT OFFICE 2,528,842

DUST-PRECIPITATING MEANS WITH SEPARABLE PLATE-ASSEMBLY UNITS

Gaylord W. Penney, Pittsburgh, Pa., assignor to Westinghouse Electric Corporation, East Pittsburgh, Pa., a corporation of Pennsylvania Application May 13, 1947, Serial No. 747,622

6 Claims. (Cl. 183—7)

My invention is directed to improvements in dust-precipitating means of a type for precipitating electrically pre-charged particulate matter from a flowing gas. For simplicity, such gas-borne particulate matter is hereinafter referred to as dust or dust-particles, or by some similar expression.

In electrostatic dust-precipitators of a type following the teachings of my Patent No. 2,129,783, issued September 13, 1938, air is first passed through an ionizing means which electrically charges air-borne dust-particles without introducing ozone or other deleterious gases into the flowing air, and then the air is passed through a dust-precipitating means which functions to remove charged dust-particles from the air. In accordance with the teachings of my aforesaid patent, a power supply is provided for the ionizing means and the dust-precipitating means; the overall device consuming very little power and being comparatively safe; thus making the device highly practicable for general use.

One of the problems in connection with electrostatic dust-precipitation of a type described is the disposing of the dirt or dust which is electrically precipitated from the air or gas-stream by the dust-precipitating means. Different schemes are known for continuously or periodically cleaning the dust-precipitating means. A satisfactory expedient is to design the dust-precipitating means with alternately insulated and uninsulated plate-electrodes from which precipitated dirt can be flushed with a flushing liquid while the dust-precipitating means remains in the gas-duct. Where flushing liquid is not readily available, or where it is not desired to expose liquid in or near the gas-duct, forms of dust-precipitators have been proposed that permit the dust-precipitating means to be completely removed from the gas-duct, and taken to some place where it can be conveniently cleaned. After cleaning, it can be replaced in the gas-duct. A special type of such dust-precipitating means comprises a plurality of relatively insulated interleaved plate-assembly units, each of which is individually readily removable from the gas-duct for cleaning or other servicing.

In the last species of dust-precipitating means, each of the interleaved plate-assembly units contains only plate-electrodes that are insulated from the plate-electrodes of the interleaved unit. In assembling the dust-precipitating means in a gas-duct, the plate-assembly units which are to have the same potential polarity are first arranged side by side, edgewise of the plate-electrodes, and with a pre-arranged clearance-space between the units. The remaining plate-assembly units are then inserted in the gas-duct so that their plate-electrodes mesh with the plate-electrodes already in the gas-duct. This second group of units is also edgewise in spaced side-by-side relation. In order to permit the units to be interleaved, each unit has heretofore been constructed with its plate-electrodes held by means located only at points along a single line clear of oppositely charged units.

The prime object of my invention is to provide an improved dust-precipitating means comprising interleaved plate-assembly units of a type described, in which the units are accurately positioned so that the space between the plate-electrodes of opposite polarity will always be accurate.

A further object of my invention is to make such plate-assembly units more rigid, so that they can be made larger and can be fairly roughly handled without fear of disturbing the alignment or spacing of the plate-electrodes.

Another object of my invention is to provide a dust-precipitating means of a type described, having plate-assembly units which can be fully and thoroughly cleaned. The units are removable to any convenient place where any tenaciously adhering dirt will be accessible with ordinary plate-cleaning implements. Hence, such a dust-precipitating means is highly desirable for cleaning gases heavily laden with gummy or other dust which, after precipitation, is difficult to remove from a plate-electrode.

Other objects, features and innovations of my invention will be discernible from the following description of several embodiments thereof, which is to be taken in connection with the accompanying drawings. In the drawings, which are not to scale:

Figure 1 is a vertical sectional view of a dust-precipitating means in accordance with my invention, with parts broken away and with all but one of the plate-assembly units shown in operating position, the said one unit being shown in a temporary location that it may occupy as it is withdrawn from or inserted into the housing therefor;

Fig. 2 is a partial sectional view, substantially along the line II—II of Fig. 1, of a completely assembled dust-precipitating means, the view showing the plate-electrodes of the grounded plate-assembly units hatched in order more clearly to distinguish them from the plate electrodes of the insulated plate-assembly units;

Figs. 3, 4 and 5 are perspective views, respectively, of an uninsulated or grounded end plate-assembly-unit, an uninsulated or grounded intermediate plate-assembly unit and an insulated or high voltage plate-assembly unit;

Fig. 6 is a perspective view of a part of the housing that removably receives the various plate-assembly units; and Fig. 7 is a perspective view of still another form of plate-assembly unit.

The form of invention shown in Figures 1–6 comprises a metallic housing 2 which carries a plurality of plate-assembly units in a manner permitting the units to be easily removed and replaced. The housing 2 comprises opposite side walls 4 and 6, a top wall 8, a bottom wall 10 and opposite open faces or sides through which a gas-stream can pass into and out of the housing so that the latter is, in effect, a gas-duct. In the particular embodiment being described, the gas-stream flows in the direction indicated by the arrows A, and enters the housing 2 after it has passed through a suitable dust-charging or ionizing means that can be attached across the full upstream open side of the housing.

The housing 2 carries two relatively insulated series of plate-assembly units to form a dust-precipitating means of the plural-plate type having interleaved, or meshed, oppositely charged electrodes in the form of metal plates. However, each of the plate-assembly units comprises only plate-electrodes all of which are to be at the same potential. Consequently, all the plate-electrodes of a unit are electrically tied together, preferably by metal bars which support and space the plate-electrodes.

The first series of plate-assembly units comprises a top and a bottom end unit 12 and 14, respectively, and as many intermediate units 16 and 18 as the dust-precipitating means is designed for. The plate-assembly units 12, 14, 16 and 18 are intended to be operated at ground potential. The second series of plate-assembly units comprises a plurality of units 48, 50 and 52. These units 48, 50 and 52 are intended to be operated at a high potential with respect to ground.

As can be observed in Figs. 1 and 2, in the assembled dust-precipitator, the grounded plate-assembly units 14, 18, 16 and 12 are vertically arranged in spaced relation; and the insulated plate-assembly units 52, 50 and 48 are similarly vertically arranged in spaced relation, and have their plate-electrodes interleaved with those of the grounded plate-assembly units.

With special reference to Fig. 3, each of the end grounded plate-assembly units 12 and 14 comprises a plurality of parallel inside plate-electrodes 20 and outside plate-electrodes 22. The plate-electrodes 20 and 22 are held in spaced relation by plate-spacing means comprising horizontal metal spacing and supporting bars 24, 26 and 28, each of which comprises a slotted spacing strip 30 which terminates near the outside plate-electrodes 22 of a unit. The outside plate-electrodes 22 may have lugs 32 which are fastened to the bars 24, 26 and 28, along the lines of the construction shown in Figs. 23 and 24 of the Pegg et al. Patent No. 2,380,992, dated August 7, 1945. However, it is important to note that a single plate-assembly unit or cell shown in the said Pegg patent has both relatively insulated and uninsulated plate-electrodes whereas each plate-assembly unit or cell of the present invention has only plates of the same potential. Consequently, the plate-electrodes of the units of the present invention can be of the same contour, and are more widely spaced.

The bar 24 is at the upstream side of the plate-assembly unit 12 or 14; and the bars 26 and 28 are at the opposite downstream corners. When the units 12 and 14 are viewed as shown in Fig. 1, the bars 24, 26 and 28 are in an out-of-line or triangular-like arrangement. The ends of the bars 24, 26 and 28 extend laterally beyond each of the outside plate-electrodes 22 of an end unit so as to provide protruding portions which are, in effect, supports by which such end unit is carried in the housing 2, as will later become apparent.

The intermediate uninsulated or grounded plate-assembly units 16 and 18 are alike and, as should be apparent from Fig. 4, are constructed in the same fashion as the top and bottom units 12 and 14. Each of the units 16 and 18 comprises a plurality of inside plate-electrodes 36 and outside plate-electrodes 38 that are held in parallel spaced relation by metal spacing and supporting bars 42, 44 and 46. These bars also include slotted plate-spacing strips. The bar 42 is centrally at the upstream side of the associated unit; and the bars 44 and 46 are vertically spaced and near the downstream corners of the associated unit. Accordingly, as seen in Fig. 1, the bars 42, 44 and 46 are in an out-of-line triangular-like arrangement. The ends of the bars extend laterally beyond each of the outside plate-electrodes 38 of an intermediate unit so as to provide protruding portions that are, in effect, supports by means of which such unit is carried in the housing 2, as will later become apparent.

The insulated plate-assembly units 48, 50 and 52 are alike and are constructed on the same principles as the other plate-assembly units. Each also comprises a plurality of inside plate-electrodes 54 and outside plate-electrodes 56 held in parallel arrangement by a plurality of triangularly arranged bars 58, 60 and 62 having associated slotted strips. The bar 58 is centrally of the downstream side of its associated unit; and the bars 60 and 62 are near corners of the upstream side of the unit. Horizontally spaced vertical bars 64 and 66 are attached to the upstream bars 60 and 62. An insulator 68 is carried at the center of each of the bars 64 and 66. Secured to the outer ends of the insulators is a horizontal supporting bar 70 having ends which extend laterally beyond the two outside plate-electrodes 56 so as to provide, in effect, supports through which the upstream side of the unit can be carried in the housing 2; the downstream side of the unit being carried in the housing 2 by a support that comprises the downstream edge of the bar 58.

For removably and replaceably carrying the different plate-assembly units, the side walls 4 and 6 of the housing carry a carrying means which comprises a plurality of carrying members attached to the housing in a proper arrangement.

For each of the top and bottom plate-assembly units 12 and 14, the carrying means comprises vertically spaced downstream carrying keepers 72 and 74 carried on each side wall 4 and 6, each keeper having a notch 76. The notches 76 of the keepers 72 and 74 receive the mating parts of end-portions of the bars 26 and 28 which extend outwardly beyond the outside plate-electrodes 22 of the associated unit, and which support the downstream sides of the units. In Fig. 3, a pair of keepers 72 and 74 is shown in broken lines to indicate the manner in which the end support-portions of the bars 26 and 28 of a unit seat into them. These support-portions of the bars 26 and 28 slidably and removably fit the keepers, as is apparent from Fig. 1. The upstream sides of the units 12 and 14 are carried by the housing 2 through upstream carrying hooks 78 on the side walls 4 and 6. These hooks receive the outwardly extending support-ends of the upstream bars 24.

Similarly, the carrying means for each of the intermediate uninsulated or grounded plate-assembly units 16 and 18 comprises downstream keepers 82 and 84 and upstream hook-keepers 80. A set of keepers 80, 82 and 84 is provided on each of the side walls 4 and 6 of the housing. Each set of such keepers receives the protruding support-ends of the bars 42, 44 and 46 at a lateral side of a grounded unit 16 or 18.

The uninsulated plate-assembly units 12, 14, 16 and 18 can be placed in an empty housing 2 from the upstream side thereof in any suitable sequence. Assume that the bottom unit 14 is the first to be placed in the housing. The support-ends of its bars 26 and 28 are slid into the downstream keepers 72 and 74 of both side walls 4 and 6 of the housing 2. After the bars 26 and 28 are seated into the keepers 72 and 74, the support-ends of the upstream bar 24 of the unit 14 can be dropped so that these ends fall into the upstream hook-keepers 78. It is necessary to tilt the unit 14 slightly as it reaches its final position so that the support-ends of the upstream bar 24 of the unit clear the top of the upstream hook-keepers 78 associated therewith on the side walls of the housing. Each of the other grounded plate-assembly units 18, 16 and 12 can be successively inserted in the housing in a similar manner, with the support-ends of their downstream bars 26, 28, 44 and 46 fitted into the notches in the downstream keepers 72, 74, 82 and 84, as the case may be, and the support-ends of their upstream bars 24 or 42 subsequently seating in the hook-keepers 78 and 80, as the case may be.

It is to be understood that the various keepers on the side walls 4 and 6 of the housing 2 are narrow horizontally so as not to interfere with the insertion and removal of the plate-assembly units; and that they are so spaced and located that a significant horizontal space is provided between each pair of superimposed grounded units 12, 14, 16 and 18. Stated differently, the keepers are arranged to cause the bottom side of an end or top unit 12 to be significantly spaced from the top side of the intermediate unit 16, the bottom side of the intermediate unit 16 to be spaced from the top side of intermediate unit 18, and so on.

For carrying the insulated plate-assembly units 48, 50 and 52, the downstream side of the housing 2 has carrying means comprising as many transverse cross-bars 90 as there are insulated units. Each bar is located so as to be in horizontal alignment with one of the aforesaid spaces between the adjacent grounded units 12, 14, 16 and 18. Each bar 90 has a pair of insulators 88 which are spaced from each other and from the side walls 4 and 6 of the housing 2. The insulated ends of the insulators 88 have keepers 86 that have notches facing in an upstream direction toward the aforesaid spaces between the grounded units.

Assuming that the grounded plate-assembly units 12, 14, 16 and 18 are carried in the housing 2 as shown in Fig. 1, then each of the insulated plate-assembly units 48, 50 and 52 can be placed in interleaved position with the grounded units by inserting them through the upstream face of the housing. As an insulated unit moves in a downstream direction through this open face of the housing, its downstream bar 58 moves in a downstream direction through the space between adjacent grounded units, until a narrow supporting side of the bar 58 nests into the associated keepers 86 on the associated insulators 88 of a bar 90. The upper part of Fig. 1 shows the position of the insulated unit 48 as it is being assembled in the housing. The bar 58 of the unit 48 can be considered to be moving through the space between the grounded units 12 and 16. Parts of the bar 58 ultimately seat into the notches of the top keepers 86. As this happens the supporting-ends of the upstream bar 70 of the unit 48 come into engaging position with the top pair of upstream hook-keepers 92 on the side walls 4 and 6 of the housing. By tilting the unit 48 slightly just before it reaches its final resting position, these ends of its bar 70 ride over the top of the associated hook-keepers 92 and then drop into them. Accordingly, the downstream side of the unit 48 is carried by the top bar 90, through associated insulators 88 and hook-keepers 86; and the upstream side of the unit 48 is carried by the two top keepers 92 on the side walls 4 and 6 of the housing. Preferably, these hook-keepers 92 and the associated bar 90 are in substantially the same horizontal level.

As can be observed in the drawings, the plate-electrodes of all the units are generally rectangular in shape, except for the downstream corners of the plates of the grounded units, and the upstream corners of the plates of the insulated units. These corners are cut away to provide more airsulation between the high voltage bars 58 and the grounded units, and between the grounded bars 42 and the insulated units.

For removing the plate-assembly units from the housing 2, the insulated units 48, 50 and 52 are first removed through the upstream side of the housing, and then the grounded units 12, 14, 16 and 18 are removed through the same upstream side of the housing. The front end of each unit to be removed is lifted slightly to clear its associated hook-keepers, and then it is pulled in an upstream direction. The steps for removing the units are believed to be obvious.

If desired, lateral adjusting expedients can be provided for adjusting position of the units laterally in a direction perpendicular to the side walls 4 and 6 of the housing, so that the lateral position of the several insulated and uninsulated units can be adjusted.

It is important to note that each plate-assembly unit comprises a plurality of plate-electrodes that are held in proper spaced relation by a minimum of three out-of-line or triangularly arranged bars. For the grounded units 12 and 14, these bars are the bars 24, 26 and 28. For the grounded intermediate units 16 and 18, these bars are the bars 42, 44 and 46. For the insulated units 48, 50 and 52, these bars are the bars 58, 60 and 62. As a result, each plate-electrode of a unit is, in effect, anchored at three out-of-line points that form a triangle. Consequently, any tendency of a plate-electrode to twist or weave about a straight line axis in its plane, is minimized. As a result there is a greater assurance that uniform spacing of interleaved plate-electrodes will be obtained every time the plate-assembly units are placed in the housing.

It is also to be noted that the triangular-like arrangement of the bars of the grounded units 12, 14, 16 and 18 have a vertical base at the downstream side of the housing; whereas the triangular-like arrangement of the bars of the uninsulated units 48, 50 and 52 have a reverse arrangement, with a vertical base on the upstream side of the housing and an apex on the downstream side. In the assembled position of the units shown in the lower part of Fig. 1, the apices, comprising a bar 24 or 42 or 58, are inwardly of the bases comprising a vertical line joining a pair of bars 26 and 28 or 44 and 46 or 60 and 62.

My invention is also applicable to plate-assembly units having plate-electrodes held together in fashions other than that hereinbefore discussed. In Fig. 7, I show a grounded plate-assembly unit 136 having its plate-electrodes 138 clamped between spacers 140 on triangularly arranged tie rods 142, 144 and 146. The tie rod 142 is centrally of a side of the unit; and the other tie rods 144 and 146 are spaced at the opposite side of the unit. Each tie rod extends beyond the outer plate-electrodes of the unit to provide, in effect, support member portions with positioning grooves 148. These grooves 148 fit and interlock keepers 150 of any suitable construction, carried by the housing.

While I have described my invention in various forms to indicate the wide scope of its teachings, it is obvious that my invention is not necessarily limited to the exact embodiments herein described except in the light of the prior art and attached claims.

I claim as my invention:

1. A plate-assembly unit for an electrostatic dust precipitator, comprising, in combination, a plurality of plate-electrodes; a first bar and spacing means associated therewith for holding the plate-electrodes spaced, said first bar extending centrally of a first side of the unit; a second and a third bar and spacing means for holding the plate-electrodes spaced, said second and third bars extending along a second side of the unit, which is opposite to said first side, the second and third bars being spaced along said second side; supports by means of which the unit can be carried in a housing, said supports extending laterally outwardly from said plurality of plate-electrodes.

2. Electrostatic dust-precipitating means comprising in combination, a housing having opposite lateral walls and open sides, a plurality of plate-assembly units; each unit comprising a plurality of plate-electrodes, a pair of said units being carried in said housing in side by side relation with a space therebetween, a third of said units having plate-electrodes interleaved with but relatively insulated from those of said pair of units, said third unit comprising a first bar along a first gas-flow side of the unit for spacing the plate-electrodes thereat, said third unit also comprising a pair of spaced bar means on the opposite gas-flow side of the unit for spacing the plate-electrodes of the unit thereat, said housing having carrying means attached thereto for carrying said first bar of said third unit substantially in line with the said space between the said pair of units.

3. Electrostatic dust-precipitating means comprising, in combination, a housing having opposite lateral side walls and open sides; a plurality of plate-assembly units; each unit comprising a plurality of plate-electrodes, each unit comprising plate-spacing means for holding the plate-electrode of the unit regularly spaced, said plate-spacing means of a unit comprising three bars in triangular-like arrangement, a first of said bars being at a gas-flow side of the unit and a pair of said bars being spaced at the opposite gas-flow side of the unit, each unit including a first support at a first lateral side of the unit and a second support at a second lateral side of the unit; said lateral side walls of the housing having carrying means secured thereto for removably receiving said supports of said units, said carrying means being arranged so that the units are interleaved with their plate-electrodes meshed but with the plate-electrode of one unit insulated from those of the interleaved unit.

4. An invention including that of claim 3 but further characterized by the triangular-like arrangement of said bars of a first of said units having an upstream apex, and the triangular-like arrangement of the unit interleaved with said first unit having a downstream apex.

5. An invention including that of claim 4 but further characterized by said apices lying within a space defined by extensions of the bases of said triangular-like arrangements.

6. Electrostatic dust-precipitating means comprising, in combination, a housing having opposite side walls and open sides; a plurality of interleaved plate-assembly units, the interleaved units being relatively insulated; each unit comprising a plurality of plate-electrodes, each unit comprising plate-spacing means for holding the plate-electrodes of the unit regularly spaced, said plate-spacing means of each unit comprising three bars, one of which is at the first gas-flow side of the associated unit and the other pair of which is at the opposite gas-flow side of the associated unit; the said bars of a first of said units being in opposite triangular-like arrangement to the said bars of an adjacent unit interleaved therewith.

GAYLORD W. PENNEY.

REFERENCES CITED

The following references are of record in the file of this patent:

UNITED STATES PATENTS

| Number | Name | Date |
|---|---|---|
| 2,195,431 | Shiveley et al. | Apr. 2, 1940 |
| 2,359,149 | Pegg | Sept. 26, 1944 |
| 2,380,992 | Pegg et al. | Aug. 7, 1945 |
| 2,486,520 | Dahlman | Nov. 1, 1949 |